United States Patent [19]

van Gompel

[11] Patent Number: 4,514,762

[45] Date of Patent: Apr. 30, 1985

[54] VIDEO SIGNAL MULTIPLYING CIRCUIT

[75] Inventor: Henricus J. van Gompel, Breda, Netherlands

[73] Assignee: U.S. Philips Corporation, New York, N.Y.

[21] Appl. No.: 471,932

[22] Filed: Mar. 3, 1983

[30] Foreign Application Priority Data

Mar. 31, 1982 [NL] Netherlands .................. 8201341

[51] Int. Cl.³ .................... H04N 5/14; H04N 5/34
[52] U.S. Cl. .................... 358/163; 358/184; 358/221
[58] Field of Search .................... 358/160-169, 358/184, 221

[56] References Cited

U.S. PATENT DOCUMENTS 3,743,772 7/1973 Pieters et al. .................. 358/163
4,354,200 10/1982 Haenen et al. .................. 358/186

Primary Examiner—John C. Martin
Assistant Examiner—Michael D. Parker
Attorney, Agent, or Firm—Thomas A. Briody; William J. Streeter; Edward W. Goodman

[57] ABSTRACT

A video signal multiplying circuit with automatic correction of a time-varying unbalance at a signal multiplier (1). A combination of a multiplying signal (MS) and a periodically pulse-shaped signal (HS) having a pulse in a blanking period (THB) is applied to the signal multiplier (1). An output (4) of the signal multiplier (1) is fedback via a signal sample-and-hold circuit (20, 21, 24, 25) and a subsequent signal comparison-and-integrating circuit (16, 17, 18) to an input (2) of the multiplier (1) to which also a video signal (VS) is applied. Signal samples are taken in the blanking period (THB), more specifically during the duration of the said pulse and outside this pulse duration. The result is that the black level in the multiplied video signal (MVS) is not influenced by the unbalance.

4 Claims, 1 Drawing Figure

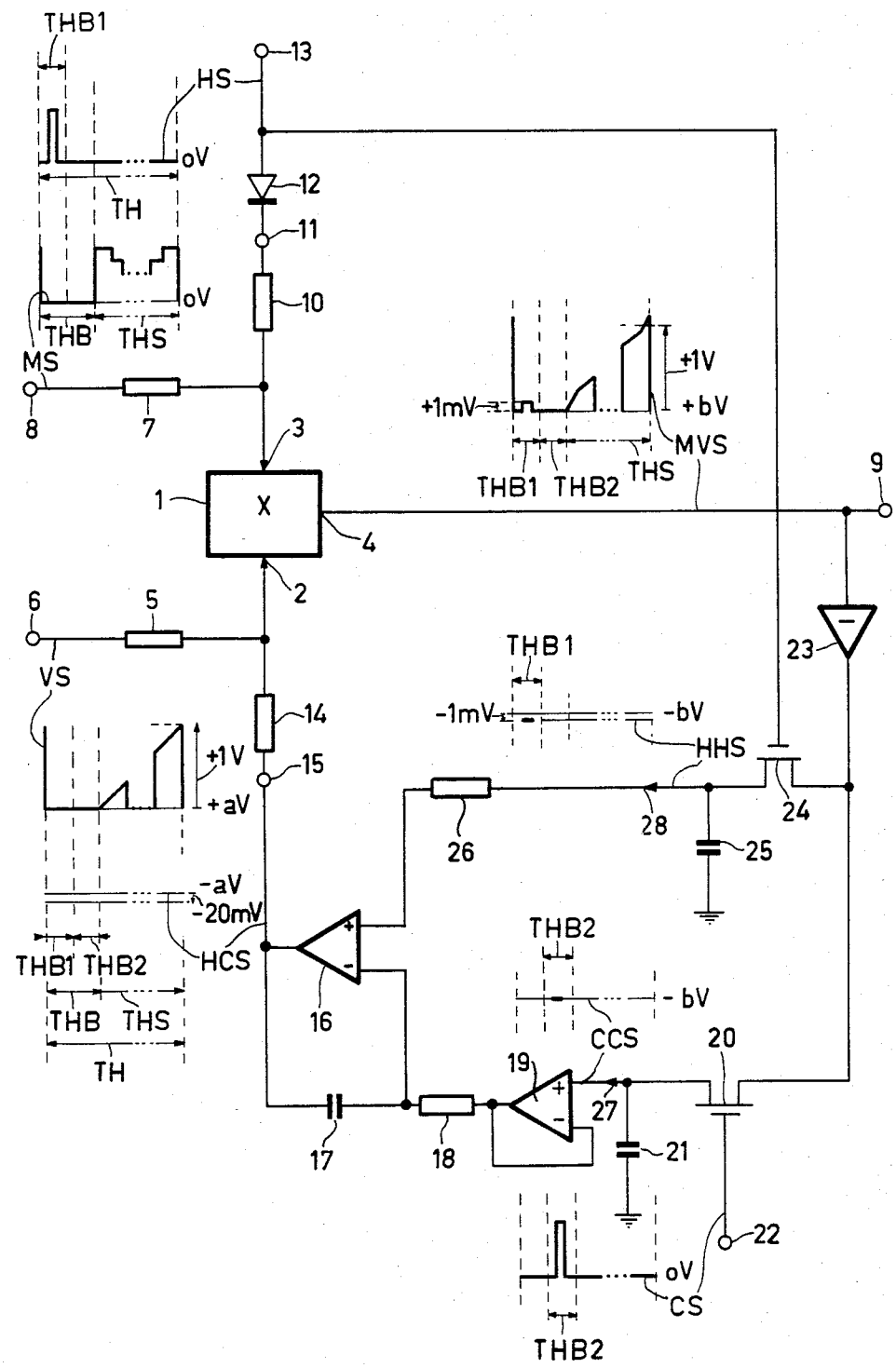

VIDEO SIGNAL MULTIPLYING CIRCUIT

BACKGROUND OF THE INVENTION

The invention relates to a video signal multiplying circuit having a first terminal for receiving a video signal, a second terminal for receiving a multiplying signal and third terminal for supplying a video signal multiplied by a signal multiplier, which terminals are coupled to respective corresponding terminals of the signal multiplier, the signals occurring with alternate scanning periods and blanking periods.

A circuit of this type is disclosed in U.S. Pat. No. 3,743,772. The circuit described in said patent is used with a television camera for effecting a shading correction. Such a correction is required when a uniformly illuminated recording area of a pick-up arrangement in the television camera results in a video or picture signal which, on display, does not result in a uniformly luminescing television picture. The multiplying signal is derived for correcting the shading errors, so that the multiplied video signal results on display in a television picture which does indeed luminesce uniformly.

In addition to the shading error correction derived for uniform illumination, a further shading error correction must be effected, more specifically at the level which is commonly referred to as the black level of the video signal. As a rule this black level is contained in at least a portion of the signal blanking periods. The black level should be present in the video signal in the scanning periods with a zero value in those positions where the recording area is not illuminated. In practice it has been found that in the absence of illumination, the pick-up arrangement still supplies a picture signal with a value deviating from black level. To correct the resultant shading error on display, a correction signal is subtracted from the video signal. Thus, two shading error corrections can be distinguished, namely the subtractive correction at the black level and the multiplicative correction at the video signal values which deviate from the black level.

For signal multiplying circuits, it generally holds that the signal multipliers are beset with an unbalance which changes in time under the influence of, for example, aging phenomena and temperature fluctuations. Such an unbalance results in the signal multiplication not occurring in an ideal manner. Instead of a multiplied video signal equal to zero occurring at the third terminal when the video signal at the first terminal or the multiplying signal at the second terminal are equal to zero, there usually occurs at the third terminal a residue of the non-zero signal. In addition, the signal multiplication at signal values deviating from zero is not effected in a pure manner, but the multiplied signal at the third terminal is formed from a purely multiplicative component and an additive or subtractive offset component superimposed thereon. Both deviations of the purely multiplicative signal processing operation vary with time, so that a more or less regularly repeated set-up of the signal multiplying circuit is required.

In the case of the described shading error correction with the subtractive correction at the black level as a zero value and the multiplicative correction at the signal values deviating therefrom, it has been found that after an optimum set-up of the subtractive correction and thereafter an optimum set-up of the multiplicative correction, the first set-up is no longer to optimal and must be repeated, whereafter the second set-up deviates from the optimum and must likewise be repeated, etc. It has been found in practice that due to the unbalance at the signal multiplier, the two set-up operations during the shading error correction must alternately be repeated several times. Added to this is the effect that the unbalance deteriorates with time, so that for an operator the set-up of the shading error correction is a time-consuming matter which requires a great deal of attention.

SUMMARY OF THE INVENTION

The invention has for its object to provide a video signal multiplying circuit wherein the unbalance which is always present in the signal multiplier is corrected automatically, so that a purest possible multiplicative signal processing results. According to the invention, an embodiment of a video signal multiplying circuit is characterized in that a fourth terminal of the signal multiplying circuit, which at the signal multiplier is associated with its second terminal, is coupled to a fifth terminal for receiving a periodically pulse-shaped signal having a pulse in a portion of the blanking period, the third terminal for supplying the multiplied video signal providing feed-back via a signal sample-and-hold circuit having two outputs and a subsequent signal comparison-and-integrating circuit to a sixth terminal which, at the signal multiplier, is associated with its first terminal, the signal sample-and-hold circuit being operative in the blanking period, more specifically in relation to the two respective outputs during the duration of the pulse and outside this pulse duration.

In order to obtain a simple pulse insertion, the signal multiplier not being loaded thereby during scanning periods, an embodiment of a circuit in accordance with the invention is characterized in that the fourth terminal is coupled via a diode to the fifth terminal for receiving the periodically pulse-shaped signal, the polarity of the pulse matching the forward conduction direction of the diode.

In order to prevent the signal comparison-and-integrating circuit from loading the signal sample-and-hold circuit to an impermissible extent, an embodiment of a signal multiplying circuit in accordance with the invention is characterized in that a (−) input of a differential amplifier present in the signal comparison-and-integrating circuit is coupled to one of the two outputs of the signal sample-and-hold circuit via a further amplifier.

DESCRIPTION OF THE DRAWING

The invention will now be further described by way of example with reference to the accompanying drawing, the drawing showing a circuit diagram of a video signal multiplying circuit in accordance with the invention.

DESCRIPTION OF THE PREFERRED EMBODIMENT

In the drawing, reference numeral 1 denotes a signal multiplier having two inputs 2 and 3 and an output 4. The input 2 is connected via a resistor 5 to a terminal 6 for receiving a video signal VS shown next to it, as a function of time. The input 3 is connected via a resistor 7 to a terminal 8 for receiving a multiplying signal MS shown next to it. The output 4 is connected to a terminal 9 for supplying a multiplied video signal MVS shown next to it. The input 3 is further connected via a resistor 10 to a terminal 11 which is connected to the cathode of a diode 12. The terminals 8 and 11 are mutually corresponding terminals of the signal multiplier 1 and they might alternatively be in the form of separate input terminals $3_1$ and $3_2$, not shown, at the multiplier 1. The anode of the diode 12 is connected to a terminal 13 for receiving a periodically pulse-shaped signal HS, shown next to it.

The input 2 is connected to a terminal 15 via a resistor 14. The terminals 6 and 15 are also mutually corresponding terminals of the multiplier 1, which might be provided instead thereof with two input terminals $2_1$ and $2_2$, not shown. The terminal 15 is connected to the output of a differential amplifier 16 the (−) input of which is connected to the output thereof via a capacitor 17. The (−) input of the amplifier 16 is connected via a resistor 18 to the output and to the (−) input, respectively, of a buffer amplifier 19. The (+) input of the buffer amplifier 19, in the form of a differential amplifier, is connected to the drain electrode of a field effect transistor 20, the junction thereof being connected to ground via a capacitor 21. The gate electrode of the field effect transistor 20 is connected to a terminal 22 for receiving a periodically pulse-shaped signal CS shown next to it. The terminal 9 is connected to the source electrode of the transistor 20 via an inverting amplifier 23 and to the source electrode of a further field effect transistor 24. The drain of the field effect transistor 24 is connected to the junction between a capacitor 25 and a resistor 26, which are arranged in series between ground and the (+) input of the differential amplifier 16. The gate electrode of the transistor 24 is connected to the terminal 13.

As regards the operation of the above-described circuit, the following components can be distinguished in the drawing: a signal sample-and-hold circuit (20, 21, 24, 25) having two outputs denoted by arrows 27 and 28 which respectively carry the signals CCS and HHS shown next to them, and a signal comparison-and-integrating circuit (16, 17, 18) which applies to the terminal 15 a signal HCS shown in the drawing.

In the drawing signal variations versus time are shown by way of example. The signal variations are not plotted to scale. Relative to distinct time periods, TH denotes a television line period which comprises a line scanning period THS and a line blanking period THB. The period THB is divided into a first and a second portion THB1 and THB2, respectively. In the video signal VS, the blanking period THB is shown that it has a value of +aV, a signal variation of, for example, +1 V occurring in the scanning period THS. The value of +aV corresponds to that which is commonly referred to as the black level and it may, for example, have the ground potential of 0 V or a positive or negative voltage value deviating therefrom. Let it be assumed that during the time scale interruption (dotted line), the black level is present in the video signal VS. In the variation of the multiplying signal MS there is shown during the line blanking period THB that the 0 V ground potential is present, a stepped signal variation being shown, by way of example, in the scanning period THS. At the beginning and the end of the period THS, the signal MS has a maximum value which decreases towards the center. The signal MS is, for example, a shading error correction signal as described in the foregoing. A result of the multiplication of the signal VS by MS, during the period THS, is shown in the signal variation of the signal MVS. Relative to a black level indicated by +bV which may, for example, be equal to the 0 V ground potential or may have a positive or negative value deviating therefrom, the signal variation shows a fluctuation of more than +1 V, the increase, which is assumed to be linear, at the signal VS at the beginning and at the end of the period THS having a maximum slope.

In the signal HS there is shown, during the period THB1, that it has a positive-going pulse relative to the 0 V ground potential further present in the line period TH. The direction of the pulse in the signal HS matches the forward direction of the diode 12 as a result of which this diode transmits the pulse which ultimately arrives in the signal MVS and occurs therein with a value of, for example, +1 mV during the period THB1. The pulse in the signal HS may alternatively have a negative voltage value; the only requirement is that the pulse value exceeds the virtual ground with the 0 V ground potential present at the input 3 by at least the anode-cathode threshold voltage of the diode 12. The pulse in the signal HS further results in that the transistor 24 may then be conductive and the terminal 9 is connected to the capacitor 25 via the inverting amplifier 23 and the source-drain path of the transistor 24. In the example given, a voltage of (−bV −1 mV) is applied, or will be applied if not yet present, across the capacitor 25, which is shown in the variation of the signal HHS for the first-mentioned case. The conducting period of the transistor 24 is shown at the signal HHS by means of a thick solid line in the period THB1. When the signal CS is applied to it, the transistor 20 operates in a similar way as the transistor 24, the difference being that the conducting period occurs in the period THB2 to a pulse then occurring in the signal CS. As a result thereof the (inverted) black level of −bV is present in the signal CCS. Applying the signals HHS and CCS to the (+) and (−) input, respectively, of the differential amplifier 16 results, in combination with the signal integration by means of the capacitor 17 and the resistor 18, in the amplifier output carrying a signal HCS with a voltage of, for example, the value of (−aV −20 mV).

The operation of the signal multiplying circuit will now be further described on the basis of the signal values given by way of example. Let it be assumed that at the inputs 2 and 3 of the multiplier 1, virtual ground with the 0 V ground potential is present, the resistors 5 and 14 having the same value. When, during a line period TH, the black level of +aV is present in the video signal VS, the +bV black level corresponding therewith must be present in the multiplied video signal MVS as will now be assumed to be the case. Applying the signal HCS with the voltage value of (−aV −20 mV) to the terminal 15 results in, when the video signal VS with the black level voltage value of +aV is applied to the terminal 6, the black level voltage value of +bV being present in the signal MVS. By applying, during the period THB1, the pulse in the signal HS to the input 3, the pulse having the value +1 mV is present in the signal MVS after multiplication by −20 mV. Via the signal sample-and-hold circuit (20, 21, 24, 25), the signal MVS furnishes the signals HHS and CCS, having the values of (−bV −1 mV) and of −bV, respectively, which via the signal comparison-and-integration circuit (16, 17, 18) furnish the signal HCS with the assumed value of (−aV −20 mV). It can be seen that by feedback from the terminal 9 to the terminal 15 which at the multiplier 1 corresponds to the terminal 6, an automatically corrected black level clamping in the signal MVS occurs in the signal multiplying circuit. A time varying-unbalance at the multiplier 1 is always corrected by the pulse insertion and the control to a minimum value in the signal MVS. By way of example, +1 mV is taken as the minimum value, which minimum value may be lower in practice. The value of −20 mV in the signal HCS is likewise given by way of example.

From the above detailed description of the operation of the signal multiplying circuit in accordance with the invention, it can be seen that it is essential that, on the one hand, the signal HCS, with the substantially constant value which changes in the time over longer periods of time due to aging phenomena and temperature fluctuations, is combined with the video signal VS and that, on the other hand, the pulse which must be eliminated is combined with the multiplying signal MS via the diode 12. In the presence of the black level in the signal VS, during the scanning periods THS, this results in the black level also being present in the signal MVS, without this level being disturbed by the signal MS.

The inverting amplifier 23 provides an inverted polarity in order to make it possible to arrive, from the value +bV in the signal MVS, at the value −aV in the signal HCS. The likewise inverted value of +1 mV in the signal MVS results in the value of −1 mV in the signal HHS and provides the value of −20 mV in the signal HCS. The inverting amplifier 23 may optionally be present in the multiplier 1.

The output 28 of the signal sample-and-hold circuit (20, 21, 24, 25) is only connected to the high-ohmic (+) input of the differential amplifier 16, so that the output 28 is not loaded. In order to prevent the output 27 from being loaded via the resistor 18 and the capacitor 17, the buffer amplifier 19 is provided. The circuit (20, 21, 24, 25) effects, as a result thereof, an unloaded signal sampling operation.

The video signal multiplying circuit is described for effecting a line frequency multiplication but it can alternatively be used to effect a field-frequency multiplication. Herein periodically pulse-shaped signals (comparable to the signals HS and CS) can be used, each having a shifted pulse in the field blanking period.

For the sake of completeness it should be noted that terminal 9 may be connected to a clamping circuit by means of which the black level of +bV in the signal MVS can be clamped at any desired value, for example on the 0 V ground potential. Such a clamping circuit may be operative in the period THB2, under the control of, for example, the signal CS.

What is claimed is:

1. A video signal multiplying circuit having a first terminal for receiving a video signal, a second terminal for receiving a multiplying signal and a third terminal for supplying a video signal multiplied by a signal multiplier, which terminals are coupled to respective corresponding terminals of the signal multiplier, the signals occurring with alternate scanning periods and blanking periods, characterized in that a fourth terminal of the signal multiplying circuit which, at the signal multiplier is associated with its second terminal, is coupled to a fifth terminal for receiving a periodically pulse-shaped signal having a pulse in a portion of the blanking period, the third terminal for supplying the multiplied video signal providing feedback via a signal sample-and-hold circuit having two outputs and a subsequent signal comparison-and-integrating circuit, to a sixth terminal which, at the signal multiplier, is associated with its first terminal, the signal sample-and-hold circuit being operative in the blanking period, more specifically in relation to the two respective outputs during the duration of said pulse and outside this pulse duration.

2. A video signal multiplying circuit as claimed in claim 1, characterized in that said fourth terminal is coupled via a diode to said fifth terminal for receiving the periodically pulse-shaped signal, the polarity of the pulse matching the forward conduction direction of the diode.

3. A video signal multiplying circuit as claimed in claim 1, characterized in that a (−) input of a differential amplifier present in the signal comparison-and-integrating circuit is coupled to one of the two outputs of the signal sample-and-hold circuit via a buffer amplifier.

4. A video signal multiplying circuit as claimed in claim 2, characterized in that a (−) input of a differential amplifier present in the signal comparison-and-integrating circuit is coupled to one of the two outputs of the signal sample-and-hold circuit via a buffer amplifier.

* * * * *